INVENTOR.
Harold E. Edgerton
BY Rines and Rines
ATTORNEYS

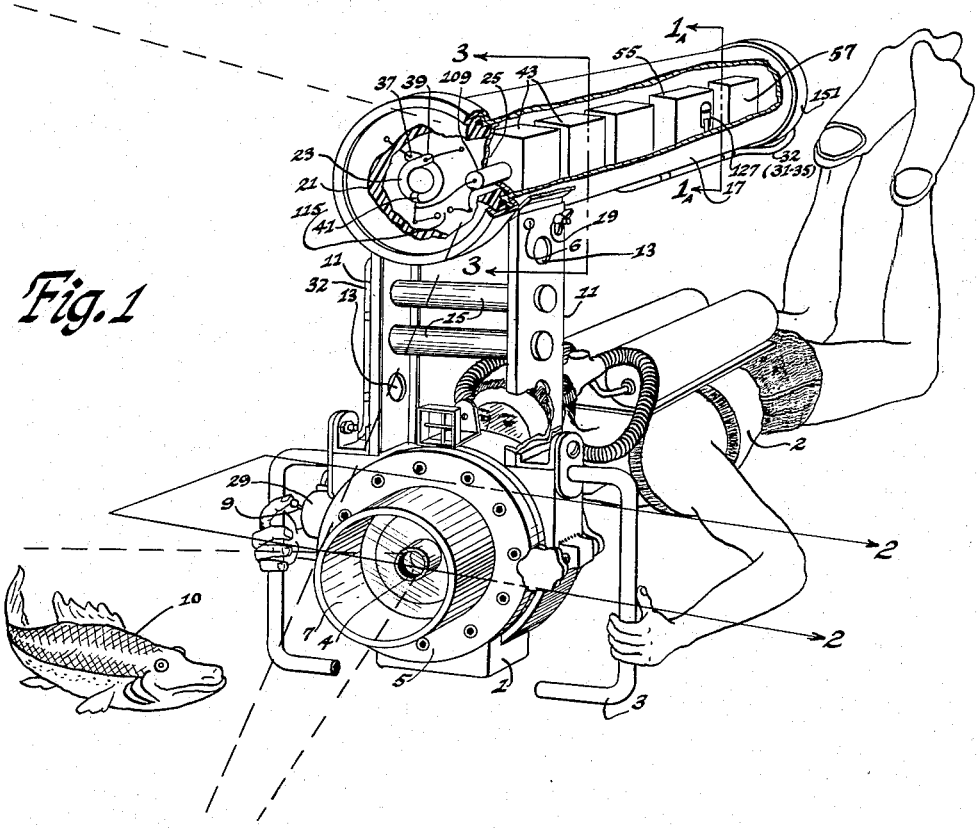

Aug. 22, 1961  H. E. EDGERTON  2,996,966
UNDERWATER-FLASH-PRODUCING-AND-PHOTOGRAPHING SYSTEM
Original Filed June 18, 1954  4 Sheets-Sheet 3

INVENTOR.
Harold E. Edgerton
BY Rines and Rines
ATTORNEYS

Aug. 22, 1961          H. E. EDGERTON          2,996,966
UNDERWATER-FLASH-PRODUCING-AND-PHOTOGRAPHING SYSTEM
Original Filed June 18, 1954          4 Sheets-Sheet 4
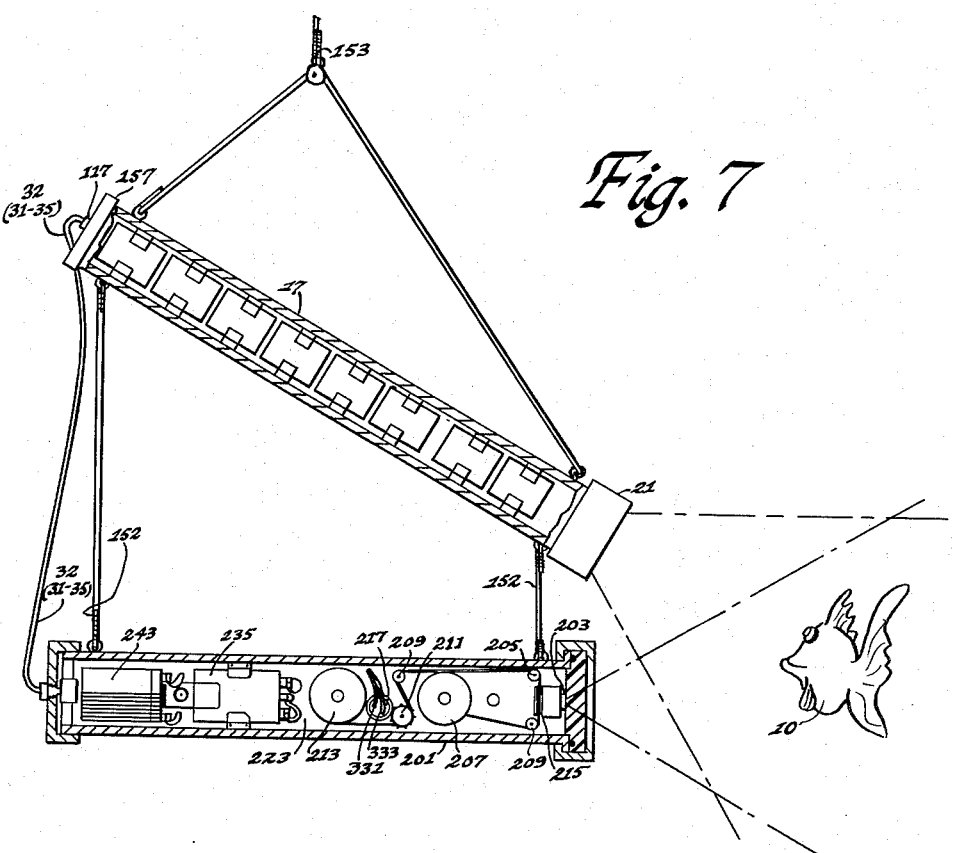
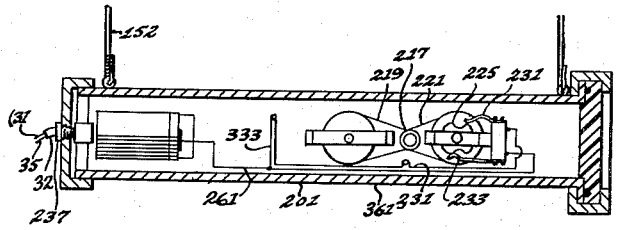
INVENTOR.
Harold E. Edgerton
BY Pines and Pines
ATTORNEYS United States Patent Office 2,996,966
Patented Aug. 22, 1961

2,996,966
UNDERWATER-FLASH-PRODUCING-AND-PHOTOGRAPHING SYSTEM
Harold E. Edgerton, Belmont, Mass., assignor to Edgerton, Germeshausen & Grier, Inc., Boston, Mass., a corporation of Massachusetts
Original application June 18, 1954, Ser. No. 437,647, now Patent No. 2,872,622, dated Feb. 3, 1959. Divided and this application Dec. 24, 1957, Ser. No. 705,056
11 Claims. (Cl. 95—11.5)

The present invention relates particularly, though not exclusively, to underwater flash-producing-and-photographing systems, this application being a division of my copending application, Serial No. 437,647, filed June 18, 1954, for Underwater Flash-Producing System, now Patent No. 2,872,622.

As explained in the said copending application, photographs have heretofore been taken underwater with the aid of artificial sources of illumination. The continuous light sources of floodlights that have been employed, however, are not particularly adapted for use photography since they require equipment of considerable size and weight and, in addition, disturb marine life that it is often desired to photograph in natural habitat. Conventional flash-producing equipment, on the other hand, such as flash bulbs and the like, are also not suited for underwater illumination since they do not produce very high peak illumination and they, like the continuous light sources, disturb live underwater objects in view of the substantial time duration of the flashes.

An object of the present invention, accordingly, is to provide a new and improved underwater light-flash-producing system that is not subject to any of these disadvantages and that, to the contrary, may be utilized in conjunction with photographic equipment to photograph animate objects without disturbing them. This result is attained through the use of portable and compact flash-discharge apparatus that may produce flashes of time duration of the order of several thousandths, ten thousandths or hundred thousandths of a second, more or less, which are sufficiently rapid so that animate objects are unaware of the flash, but which are, however, of high enough intensity to permit of exposing a photographic film of an appropriately synchronously operated camera.

A further object is to provide an automatic camera for use with such flashing apparatus.

Still an additional object is to provide a novel camera system of more general application.

Another object is to provide a system of the character described that is particularly suited for the automatic taking of successive photographic exposures.

Other and further objects will be explained hereinafter and will be more particularly pointed out in the appended claims.

The invention will now be described in connection with the accompanying drawings FIG. 1 of which is a perspective view of a flash-photography apparatus constructed in accordance with a preferred embodiment of the invention, parts being shown broken away to illustrate details of construction;

FIG. 1A is fragmentary section, taken upon the line 1A—1A of FIG. 1, looking in the direction of the arrows, and drawn upon an enlarged scale;

FIG. 2 is a fragmentary perspective view, also upon a larger scale, taken along the line 2—2 of FIG. 1, looking in the direction of the arrows;

FIG. 3 is a section taken upon the line 3—3 of FIG. 1, looking in the direction of the arrows;

FIG. 7 is a side elevation, shown partly broken away and sectioned, illustrating the use of the present invention in an automatic photography system; and FIG. 8 is a sectional view of the camera of FIG. 7, viewed from the opposite side.

Figure 4:
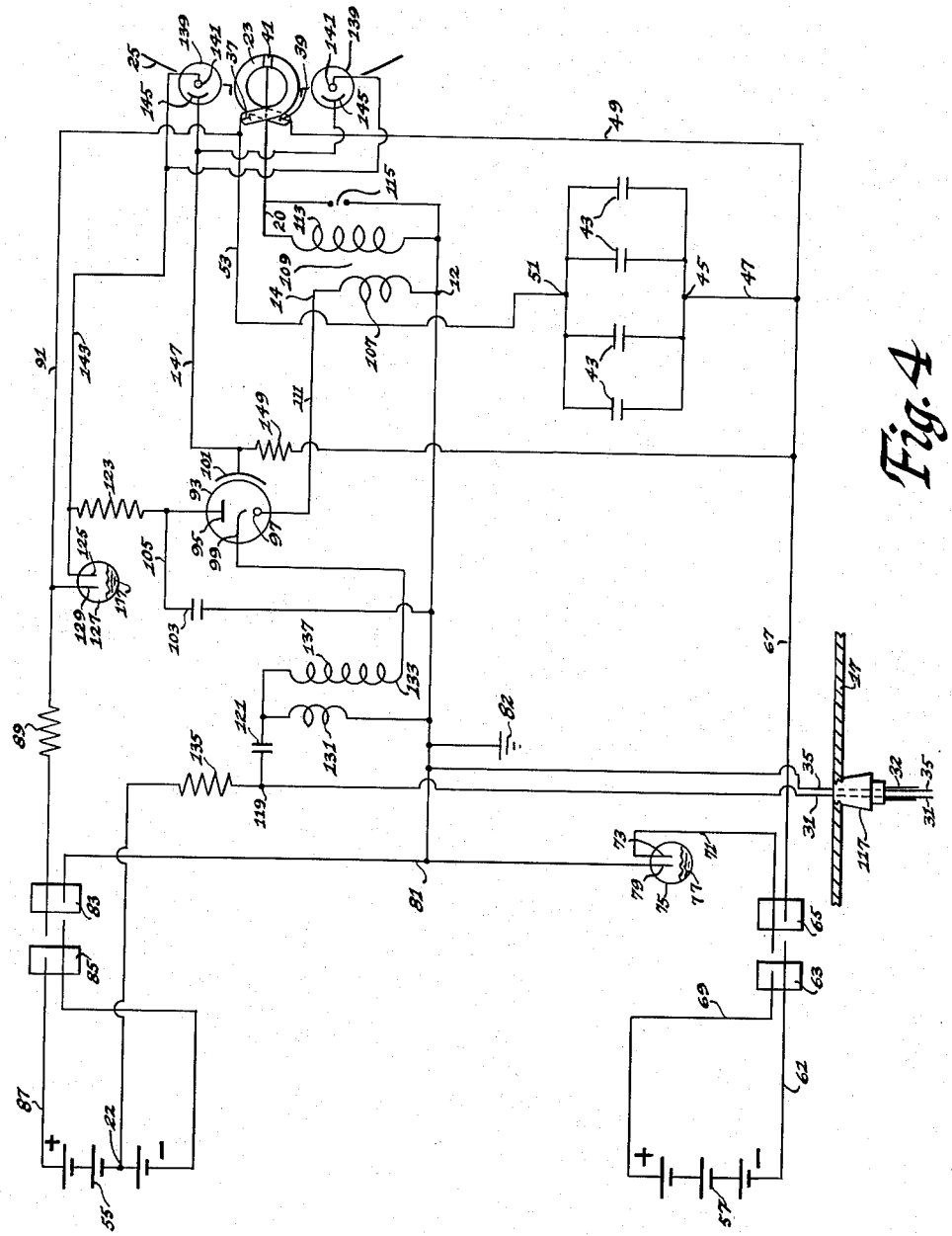
FIG. 4 is a circuit diagram of a preferred electric circuit for operating the flash apparatus of FIG. 1.

Referring, first, to FIG. 1, a camera housing 1 is shown provided with a hand frame 3 that may permit it to be manipulated by an underwater operator 2. The camera housing 1 may be of any desired conventional watertight construction, embodying, for example, a gasket-provided cover 5 bolted or otherwise hermetically sealed to the housing 1 and provided with a transparent watertight window 7 disposed opposite to the camera lens 4. The shutter mechanism of the camera, not shown, may be controlled by a push button or plunger 9 on one side of the housing 1, shown to the left in FIG. 1, so that inward movement of the plunger 9 will operate the shutter of the camera, as is well known. Projecting upward from the camera housing 1 are a pair of parallel struts 11 that are preferably apertured at a plurality of regions 13 in order to permit the insertion therein of cylindrical weights 15. The weights 15 permit the underwater operator 2 to dive down to desired depths with the apparatus, and to manipulate the same underwater. If more buoyancy is required, some of the weights 15 may be replaced by cork or wood elements and the like. At the upper ends of the struts 11 there is pivotally mounted at 6 a tubular cylindrical housing 17 containing the flash-illumination equipment. The housing 17 for the light-flash-producing apparatus may be pivoted about the pivot 6 to any desired angle with respect to the struts 11 by adjusting a wingnut 19 within a slot 18, FIG. 3. While in FIG. 1, the struts 11 are shown vertically oriented and the housing 17 is mounted substantially horizontally, the housing 17 may be pointed upward or downward, as illustrated in connection with the housing 17' of FIG. 5. In fact, when the equipment is to be stored or transported, the housing 17 may be pivotally collapsed adjacent the struts 11, as shown in the dotted-line position 17 of FIG. 3. At the front of the cylindrical housing 17, corresponding to the window 7 of the camera housing 1, there is provided a transparent hermetically sealed window 21, as of Plexiglas, through which the flash illumination, produced by a flash-lamp 23 mounted in the focal region of a preferably parabolic reflector 25, may pass in order to flash-illuminate the object or scene 10 to be photographed by the camera 1.

By causing the movement of the shutter-operating plunger 9 synchronously to effect the triggering of the flash-lamp 23, the underwater diver 2 may readily obtain flash exposures of underwater life or other underwater objects. This synchronization may be effected, for example, by mounting a contact member 27 upon the shutter plunger 9 within a sealed chamber 29 attached to a side of the housing 1. The contact member 27 may be connected to a conductor 31. A further contact member 33, connected to a further conductor 35, may be disposed within the chamber 29 to become engaged by the contact member 27 when the plunger 9 is pushed inward to open the camera shutter. The conductors 31 and 35 are therefore connected together by the engagement of the contact members 27 and 33 when the operator 2 pushes the shutter-mechanism plunger 9 inward. The conductors 31 and 35 are carried to the housing 17 by an insulating water-tight cable 32. It is this connection of the conductors 31 and 35, as later explained, that initiates or triggers the production of a discharge in the flash tube 23 in the housing 17.

A preferred circuit for flashing the flash tube 23 is illustrated in FIG. 4. The flash tube 23 is preferably in the form of a loop containing a gaseous medium, of any desired gas at any desired pressure, and having an internal principal anode electrode 37 at one end, an internal principal cathode electrode 39 at the other end, and an external trigger, control or band electrode 41 disposed intermediate the ends of the tube. The flash tube may, however, be of any other desired type such as is described, for example, in my United States Letters Patent No. 2,478,901, issued August 16, 1949, or of the type described in Letters Patent 2,492,142, issued December 27, 1949, to Kenneth J. Germeshausen, or of any other type, embodying any desired shape, configuration, type of electrodes or gases. A bank of parallel-connected condensers or capacitors 43, provided with common terminals 45 and 51, is connected by conductors 47, 49 and by conductor 53, respectively, between the cathode 39 and the anode 37 of the flash tube 23. This bank of condensers 43 is preferably mounted near the forward end of the cylindrical housing 17, along the axis of the same, as shown in FIG. 1. The condensers 43 are charged with a relatively high voltage that, as later explained, is preferably, however, low with respect to the voltages customarily utilized in such flash equipment, from two groups of storage batteries 55, 57, preferably of the dry-cell type. The batteries 55, 57 may also be mounted upon a chassis in line with the condensers 43 within the housing 17, though rearward thereof, as illustrated in FIG. 1. The lower or minus terminal of the batteries 57 may be connected by a conductor 61 to a plug connector 63, which, when engaged with a cooperative plug connector 65, provides a connection from the conductor 61 to a conductor 67. The conductor 67, in turn, is connected to the conductor 47 and hence to the lower terminal 45 of the bank of condensers 43. The upper or + terminal of the batteries 57 is connected by a conductor 69 and the plug connectors 63 and 65 to a further conductor 71. The conductor 71 is connected to one electrode 73 of a switch element 75, preferably of the mercury-switch type. The mercury switch may be mounted on one side of the batteries 55, FIG. 1A. When the mercury pool 77 of the switch 75 is tilted within the switch 75, electrical contact may be established from the electrode 73 through the pool 77 to the other electrode 79. The conductor 71 is thus connected to still a further conductor 81 that is preferably grounded or connected to a terminal of the chassis of the apparatus, as shown at 82. The conductor 81 connects to a further plug connector 83 which, when mated with a cooperative plug connector 85, establishes a connection to the lower or minus terminal of the batteries 55. The + terminal of the batteries 55 is connected by still an additional conductor 87 and the plug connectors 85 and 83 through a charging resistor 89 to a conductor 91 that connects by conductor 53 to the upper terminal 51 of the bank of condensers 43.

When the respective plug connectors 63, 65 and 83, 85 are connected together, and the switch 75 is tilted to establish electrical connection between its electrodes 73 and 79, therefore, the bank of condensers 43 becomes charged from the batteries 55 and 57 through the charging resistor 89. The voltage at which the condensers 43 are charged is preferably insufficient to break down the gas within the flash-tube 23, so that the condensers 43 cannot normally discharge through the tube 23 between the anode 37 and the cathode 39 thereof. Such discharge and energization of the flash-tube 23, to the contrary, is preferably effected only upon energization of the trigger or control electrode 41. The trigger circuit within the housing 17 for energizing the trigger electrode 41 comprises a normally non-conductive ineffective electric-discharge trigger tube 93 of the gaseous-discharge thyratron type, having an anode 95, a cathode 97, an internal control electrode 99 and, as will be later explained, an external trigger electrode 101 which may comprise turns of wire wound about the envelope of the tube 93. Other types of trigger or switch devices may also be used. A further condenser or capacitor 103 is employed, at the appropriate instant, to discharge through the trigger tube 93 when the tube is rendered effective. When a further mercury switch 127, similar to the switch 75, is tilted, as shown in FIG. 1, its electrodes 125 and 129 become connected together by the mercury pool 177 and effect the charging of the condenser 103. This charging occurs in the circuit traceable from the upper terminal of condenser 103, by conductor 105 to resistor 123, through the switch 127, resistor 89 and plug connectors 83 and 85 to the + terminal of batteries 55; thence, from the — terminal of batteries 55 and conductor 81 to the lower terminal of condenser 103. The upper terminal of the condenser 103 is also connected by conductor 105 to the anode 95 of the trigger tube 93. The lower terminal of the condenser 103 is further connected to the ground or chassis terminal 82, which, in turn, connects with the lower terminal 12 of the primary winding 107 of a trigger transformer 109. The transformer 109 may be mounted within the housing 17, forward of the condensers 43, as shown in FIG. 1. The upper terminal 14 of the primary winding 107 is connected to the cathode 97 of the trigger tube 93.

Discharge of the capacitor 103 takes place through the trigger tube 93 and the primary winding 107 in series. It will produce a trigger impulse in the primary winding 107 that may be stepped-up in the secondary winding 113 of the transformer 109. The upper terminal of the secondary winding 113 is connected by conductor 29 to the trigger electrode 41 of the flash-tube 23, and the lower terminal of the secondary winding 113 is connected to the lower terminal 12 of the primary winding 107. The discharge of the condenser 103 through the trigger tube 93 and the primary winding 107, thus, applies a trigger stimulus to the trigger electrode 41 through the secondary winding 113. This trigger stimulus tends partially to break down the gas in the flash-tube 23 and thus permits the condensers 43 to thereupon discharge their voltage between the anode 37 and the cathode 39 of the flash-tube 23, producing an instantaneous flash of light of high intensity. Such light is known to have characteristics that permit of true color photography, which is important underwater.

It remains to explain how the trigger tube 93 is itself operated to produce the instantaneous flashing of the flash-tube 23. As before explained, the closing of the contactors 27 and 33, FIG. 2, synchronously with the opening of the camera shutter, connects together conductors 31 and 35. These conductors 31 and 35 are shown in FIG. 4 entering the tubular housing 17 of the flash-producing apparatus through a watertight plug 117, preferably at the rear of the housing, as more clearly shown in FIG. 7. The conductor 35 connects with the ground or chassis terminal 82 and the conductor 31 with a left-hand terminal 119 of a still further condenser 121. This further condenser 121, like the trigger-tube condenser 103, is normally charged from the battery 55. The right-hand terminal of the condenser 121 is connected through a primary winding 131 of a further transformer 133 to the ground terminal 82 and by the conductor 81 and plug connectors 83 and 85 to the negative or minus terminal of the batteries 55. The left-hand terminal 119 of the condenser 121, on the other hand, is connected through a further charging resistor 135 to an intermediate positive terminal 22 of the batteries 55, so that a lesser voltage charges the condenser 121 than the condenser 103. When the conductors 31 and 35 are connected together by the operation of the shutter plunger 9, the left-hand terminal 119 of the condenser 121 becomes connected through the connected conductors 31 and 35 to the ground terminal 82, and thus across the primary winding 131 of the transformer 133. The condenser 121 thus thereupon discharges through the primary winding 131. This discharge produces an impulse in the secondary winding 137 of the transformer 133 that rapidly raises the voltage upon the control electrode 99 of the trigger tube 93 with respect to the terminal 82, rendering the tube 93 conductive and hence effective between its anode 95 and its cathode 97. The condenser 103 thereupon discharges through the thyratron 93 to effect the triggering of a flash in the flash-tube 23, as before described. As the shutter-mechanism plunger 9 is thus operated by the underwater diver 2, to open the shutter mechanism of the camera 1, the flash-tube is synchronously flashed. Release of the shutter-mechanism plunger 9, which may be spring-operated to return to its normal position, renders the trigger circuit adaptable for recharge to ready the same for a second flash at a subsequent time.

Figure 5:
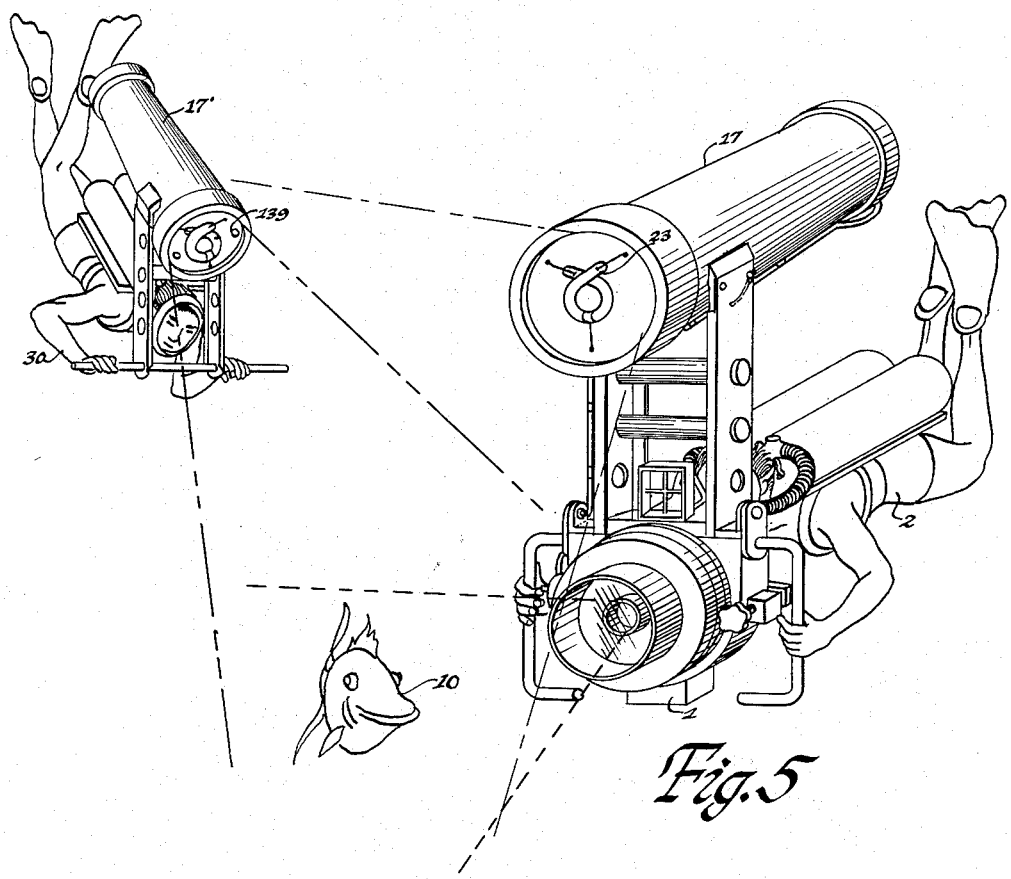
FIG. 5 is a perspective view similar to FIG. 1 illustrating a modified use of the apparatus of FIG. 1.

In the event that it is desired, on the other hand, to cause the presence of some illumination or other radiation in the water automatically to trigger off the flashtube 23, the trigger tube 93 may be triggered by photocells or similar devices 139, preferably mounted within the reflector 25, as shown in FIGS. 4 and 5, to the sides of the flash-tubes 23. The camera shutter would then be normally maintained open. The anodes 141 of a pair of such photocells 139, disposed within the reflector 25, may be connected in parallel to a conductor 143, and thence to the upper terminal of the charging resistor 123. The cathodes 145 of the photocells 139 may be similarly connected in parallel by a conductor 147 through a further resistor 149 to the conductor 67 which, in turn, as before stated, is connected ultimately to the negative or minus terminal of the batteries 57. The photocells are thus supplied with operating voltage from the batteries 55 and 57 when the mercury switches 127 and 75 are in operative positions, FIG. 1. Any illumination or other radiation falling upon these photocells 139 will cause a variation in the current passed through the resistor 149. Since, however, the upper terminal of this resistor 149 is connected, also, to the external control electrode 101 of the trigger tube 93, this will serve to increase the voltage upon the electrode 101 and thus to render the trigger tube 93 conductive, thereby to trigger the flash-tube 23, as previously explained.

In accordance with the present invention, therefore, either the operator 2 may deliberately flash the apparatus to take a picture, or some radiation phenomenon under water may itself operate the flash mechanism. In this connection, one or more substantially identical flash-producing apparatus may be positioned in the water or carried by another underwater operator 30, as shown at 17′ in FIG. 5, to provide side or other supplemental illumination. The flashing of the flash-tube 23 of the flash apparatus 17, by the underwater operator 2, for example, will provide illumination that, falling upon the photocells 139 carried in the second flash-producing apparatus 17′, will thereupon trigger the supplemental flash-producing device 17′ to produce additional illumination.

It is now in order to explain some of the electrical advantages obtained with the aid of the type of circuit disclosed in connection with the embodiment of FIG. 4. Through the use of the plurality of trigger electrodes 99 and 101, of course, flashing may be produced either as a result of internal synchronization from the camera-shutter mechanism, or as a result of external triggering, as from an outside source of radiation. The use of two sets of plug connectors 63, 65 and 83, 85 associated with the respective batteries 57 and 55, enables the voltage sources to be easily disconnected in order to isolate the circuit from voltage in the event that repairs are necessary. The mercury or similar position-operated switches 75 and 127 serve at least two important purposes. First, the upper switch 127, if oriented to its inoperative position, FIGS. 1A and 4, keeps voltage off the trigger-tube anode 95, so that the trigger circuit cannot possibly operate the flashtube 23. If the other mercury switch 75 is not employed, the voltage of the upper and lower banks of batteries 55 and 57 might bleed off through the capacitors 43. The introduction of the mercury switch 75, however, prevents such a condition. Shunting the secondary winding 113, of the trigger transformer 109, moreover, is a spark or air gap 115 that has been found to aid in the starting of the flash in the flash-tube 23. This important feature may be explained as follows. It is desirable in units designed for the purposes described, that the voltage upon the capacitors 43, as before indicated, be relatively low compared with the voltage utilized in more conventional flash-discharge circuits operated in air, say, of the order of four or five hundred volts, more or less. It is, of course, important where electric equipment is being operated near or in the water, that the voltages be maintained relatively low. Normally, the distributed capacitance between the trigger electrode 41 and the cathode 39 of the flash-tube 23 products, in cooperation with the impedance of the secondary winding 113 of the trigger transformer 109, a relatively low resonant frequency, say, of the order of 20,000 cycles. The spark gap 115 serves to discharge the voltage developed in the said distributed capacitance between the trigger electrode 41 and the cathode 39, by breaking down to provide a shunt path thereacross. This shunt path, however, is of low inductance compared with the inductance of the secondary winding 113 of the trigger transformer 109, so that the resonant frequency of the said distributed capacitance together with the inductance of the shunt path produced by the arcing spark gap 115, is very much higher than 20,000 cycles. The resulting very high frequency radiation passes through the envelope of the flash-tube 23 and into the gas thereof and has been found to assist in effecting the ionization of the gas. Through the use of the shunt spark gap 115, the ionizing and flashing of the tube 23 is insured upon the energization of the trigger electrode 41, even though the voltages utilized may be less than those normally employed in flash-producing equipment.

A further advantage of the circuit of FIG. 4 resides in the low-impedance synchronizing circuit provided by shorting the conductors 31 and 35. The normally deleterious effects of moisture and salt water are thus obviated with such a trigger-initiating device. The banks of batteries 55 and 57, moreover, are intermediately connected to the chassis at 82, thus, again, minimizing the problems of operating voltages in dampness and moisture.

Turning, now, to the mechanical advantages of the invention, the cylindrical housing 17 and the described arrangement of the parts therein not only simplifies the packaging of the equipment, but also facilitates rapid repair. It is merely necessary to remove the gasket-mounted Plexiglas or other window 21 front-end cap and to remove the other end plate 151, thereby to slide the apparatus chassis out of the watertight housing 17. The details of construction of the mounting of the window 21 and the end plate 151 may be similar to those illustrated in the embodiment of FIG. 7. The mechanical construction of the system, moreover, provides dynamic balance so that the operator 2 may hold the apparatus in any desired position without tipping. By proper adjustment of the weights or other bars 15, the apparatus may be held level so that, as the operator steadies it, it has neither a tendency to sink nor to float. The use of an air space within the camera housing 1 and within the casing 17 provides further buoyancy to the apparatus, and the walls of the housing 1 and 17 may be weighted to obtain any desired balance. In general, however, the balance criterion to be achieved is that the average density of the whole apparatus should be substantially the same as that of the water in which it is being used and the dynamic balance of the whole system should be adjusted so that there is nothing tending to twist or upset the apparatus.

Of great importance, however, is the fact that, if the apparatus is held in a position such that the mercury switches 75 and 127 are in their ineffective positions, as illustrated in FIGS. 1A and 4, the operator 2 may swim about with the apparatus without any danger of false operation. This can be achieved by holding the apparatus 1–17 on its side, as illustrated in FIG. 1A, until it is desired to take a photograph. Merely by orienting the apparatus into the position shown in FIG. 1 where the mercury switches 75 and 127 are tilted to their operative positions, the apparatus is immediately readied for and effective for use. External rotation or other orientation of the apparatus, therefore, renders the system either ineffective or effective for operation without the need for any external wires, switches and the like, except for the camera-shutter operating mechanism. This mechanism may also be eliminated when photocell triggering is used, as previously explained, or when an automatic operation is effected as later described in connection with the embodiments of FIGS. 7 and 8.

An illustration of the details of a practical apparatus of this character follows. First, with regard to the circuit of FIG. 4, the trigger tube 93 may be of the RCA 5823 type with an external electrode 101 comprising 10 turns of bare wire. The capacitors 43 may be of approximately 525 microfarads each. The voltage to which the capacitors 43 are charged may be about 450 volts, and the batteries 55 and 57 may comprise banks of 90-volt drycell batteries. For use with the low-impedance type of grounded triggering circuit 31—35, the condenser 121 may have a value of about 0.1 microfarad and the resistor 105 may have a value of about 1 megohm. The resistors 89, 123 and 149 may have respective values of about 125,000 ohms, 100,000 ohms and 10 megohms. The trigger-tube condenser 103 may have a value of about 1 microfarad and the photocells 139 may be of the RCA 934 type. The flash-tube 23 should be of the low voltage starting type and may, for example, be a General Electric FT–218 tube. The gap separation in the air gap 115 across the secondary winding 113 of the trigger transformer 109 is preferably of about from 1/16 to about 3/32 of an inch for this particular circuit. In connection with the mechanical details, the casing 17 may have a length of about two feet and a diameter of about six inches. It may be constructed of brass tubing having a wall thickness of about 0.1 inch. The camera housing 1 may weigh about ten pounds, and the struts 11 may be about two feet long.

Figure 6:
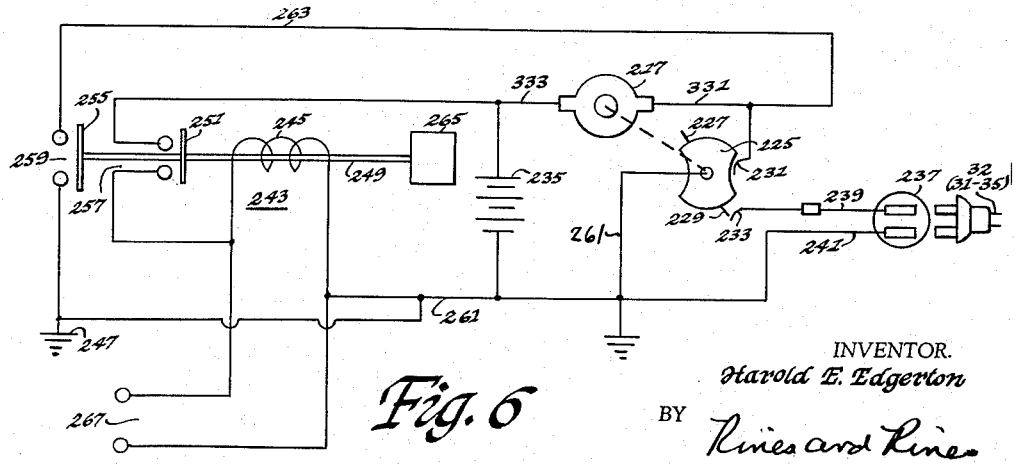
FIG. 6 is a circuit diagram of a synchronizing circuit and apparatus for the system of FIG. 7.

The present invention is not restricted to use with a human operator 2. It is, indeed, unnecessary that an operator be associated in any way with the equipment other than to lower the same into the water. In FIGS. 7 and 8, which represent the preferred embodiment of the present invention claimed herein, therefore, an apparatus is illustrated that embodies a tubular flash-apparatus housing 17 of the type previously discussed in connection with the embodiment of FIG. 1, and a camera housing 201. A cable 153 suspends the flash-apparatus housing 17 at a downward incline in order to direct the light flashes at a scene 10 to be covered by the camera. The camera housing 201 may, in this case, also be of tubular cylinder construction having a lens 203 for focusing an underwater object or scene 10 upon a film 205. The camera housing 201 may be suspended from the housing 17 by proper lengths of cables 152 to maintain the camera substantially horizontal when lowering it. The film 205, such as 35-millimeter moving-picture film, is shown wound upon a supply reel 207 and fed therefrom over guides 209 and over a sprocket 211 to a take-up reel 213. A conventional gate 215 may be disposed between the lens 203 and the film 205 to permit the passage of the film. A motor 217 is mounted on one side of a vertical chassis 223. Its shaft extends through to the other side where it drives take-up and supply-wheel pulley belts 219 and 221, FIG. 8. The motor 217 is operated at periodic intervals of time to expose a new portion of the film 205 after each flash of the flash-apparatus 17 in order to enable the automatic taking of successive flash photographs. This operation may be more clearly understood by referring to the circut diagram of FIG. 6 where the motor is schematically illustrated at 217. Upon the shaft of the supply reel 207 there is mounted a cam 225 that is rotated in response to rotation of the shaft 216 of the motor 217. This is schematically illustrated in FIG. 6 by the dotted line connecting the motor 217 and the cam 225. It is shown in FIG. 8 as effected by the pulley belt 221. The cam is provided with a pair of oppositely disposed contact members 227 and 229. A timing device is used to move the film 205 by operating the motor 217 after the production of a flash of light. This time-delay device 243 may take the form of an armature 249 controlled by a relay coil 245 and re-set by a time-controlled spring or other return device 265, such as an "Agastat" type of mechanism. Two switches 255 and 251 are synchronously opened or closed by the movement of the armature 249. When the armature 249 is displaced to the left, the switch 255 is closed, shorting contacts 259. The right-hand terminal of the motor 217 is then connected by conductors 331 and 263 to the chassis or ground at 247. Since the negative side of a motor battery 235 is also grounded at 261, the right-hand terminal of the motor 217 is connected to the negative side of the battery 235. The left-hand motor terminal is permanently connected by conductor 333 to the positive terminal of the battery 235 so that the motor is now energized and starts to rotate the cam 225. The cam contact member 227 then connects with the fixed contact member 231 keeping the motor connected across the battery 235 and thus rotating until these contact members disconnect. In the meantime, the closing of the switch 251 with contacts 257 causes the battery 235 to feed energy to the relay coil 245, returning the armature 249 to the right and opening the switch 255. When the cam contact members 227, 231 have become disconnected, the motor 217 is therefore no longer connected through the switch 255 to ground, and is de-energized. The spring or other time-delay device 265 is then operative to push the armature 249 to the left again, re-starting the cycle. After the film 205 has been advanced to a new position, moreover, the contacting of the further cam contact member 229 with the fixed contact 233, which are so positioned, as shown, that they contact when the motor-stopping contact members 227, 231 become disconnected, effects the short-circuiting of conductors 239 and 241 by conductor 261. These conductors may be connected to a plug 237 that, in turn, connects with the trigger cable 32, containing conductors 31 and 35, before discussed. The flash apparatus 17 is thus periodically and automatically flashed to expose each successive new position of the film 205 after the film has been moved to such new position. The apparatus, furthermore, is quiet at the time that a flash is produced, the motor 217 having stopped, and any life being photographed will not be aware of either noise or the almost instantaneous flash of light. No gears or claw mechanisms and the like are necessary, furthermore, all of the film-advancement and trigger-initiation being achieved by the cam operation. The assembly of the camera parts along the axis of the housing 201 provides similar advantages to those discussed in connection with the flash-apparatus housing 17. Should it be desired to operate the armature 249 of the time-delay device 243, not in response to the spring 265, but under the exclusive control of voltages in the relay 245, voltage pulses of the desired time duration may be applied to the terminal 267. These terminals 267, for example, may be connected in the before-described photocell circuit, as across the resistor 149 of FIG. 4, so that the triggering may be achieved by self-luminous objects or other radiation. The relay coil 245 may also be energized by other external sources of voltage pulses to obtain exposures at the desired successive intervals of time.

The apparatus 17—201 may be lowered into the water in one position, say upon its side, as with the aid of a side-operated cable, not shown, so that the mercury switches 127 and 75 are in their inoperative positions. By releasing the side-operated cable, not shown, the apparatus 17—201 may be suspended in the position illustrated in FIG. 7 in which the switches 127 and 75 are in their operative positions, thus enabling the apparatus to operate thereafter automatically, periodically flash-photographing whatever may be in front of the camera. If desired, the apparatus 17—201 may be rotated from a vessel in order to obtain a panoramic view of photographic explorations. The photographic camera, moreover, in all embodiments of the invention may, if desired, be replaced by a television camera or any other light-sensitive device.

Further modifications will occur to those skilled in the art and all such are considered to fall within the spirit and scope of the invention as defined in the appended claims.

What is claimed is:

1. Apparatus of the character described comprising a first watertight housing containing an electric flash-producing system having a flash-tube disposed at one end thereof, an electric circuit for energizing the flash-tube and a trigger circuit for initiating the energization of the flash-tube by the electric circuit; position-controlled switching means adapted to open or close depending upon the position of the housing; means for interposing the switching means in the electric and trigger circuits, the switching means, depending upon the position of the housing, serving either to complete the electrical connections of the electric and trigger circuits through the closed switching means, thereby to render the system effective for the production of an electric flash upon the operation of the trigger circuit, or to maintain the electric and trigger circuits incomplete at the open switching means, thereby to render the system ineffective to produce an electric flash; a second watertight housing depending from but in predetermined relationship with respect to the first housing and containing a camera having a lens disposed to receive light reflected from objects illuminated by the electric flash of the flash-tube, and means for periodically advancing a film to expose successive portions of the film to the lens; and means operable synchronously with the exposure of successive portions of the film to the lens for initiating the operation of the trigger circuit, thereby to produce an electric flash in the flash-tube for each successive portion of the film.

2. Apparatus of the character described comprising a first substantially cylindrical watertight housing containing a removable chassis extending along the housing and carrying in-line thereupon the electrical components of an electric flash-producing system, a reflector mounted at one end of the housing and provided with a flash-tube connected to be energized by the flash-producing system, a watertight cover for the said one end of the housing having a window exposing the flash-tube, and a removable watertight cover for the other end of the housing through which the chassis may be inserted into the housing or removed therefrom; a second substantially cylindrical watertight housing connected with, in fixed relationship to, but displaced from the first housing and containing a removable camera chassis extending along the housing and carrying in-line thereupon a lens, film take-off and receiving means and electrical apparatus for periodically operating the same to advance successive portions of the film for exposure through the lens, the second housing having a window for receiving light reflected from objects illuminated by the electric flash of the flash-tube, and an electric flash-and-film-advancing synchronizing cable interconnecting the housings.

3. In a system contained within housing means, a camera having a motor-operated film-advancing mechanism, an electric flash-producing circuit for generating a flash of illumination for exposing the film of the camera, energy-supplying means for energizing the camera motor and the flash-producing circuit, a switch operated synchronously with the operation of the camera motor, electrical connection means between the switch and the flash-producing circuit for effecting the triggering of the flash-producing circuit to produce a flash of illumination in response to the operation of the switch, position-controlled switching means adapted to open or close depending upon the position of the housing means, and means for connecting the position-controlled switching means in circuit with the energy-supplying means, the switching means, depending upon the position of the housing means, serving either to render the flash-producing circuit effective or ineffective to produce a flash of illumination.

4. In a system contained within housing means, a camera having a motor-operated film-advancing mechanism, an electric flash-producing circuit for generating a flash of illumination for exposing the film of the camera, energy-supplying means for energizing the camera motor and the flash-producing circuit, timing means for rendering the energization of the camera motor periodic in order, at successive intervals of time only, to effect the advancing of the film, a switch operated synchronously with the advancing of the film by the camera motor, electrical connection means between the switch and the flash-producing circuit for effecting the triggering of the flash-producing circuit to produce a flash of illumination upon the advancement of the film, position-controlled switching means adapted to open or close depending upon the position of the housing means, and means for connecting the position-controlled switching means in circuit with the energy supplying means, the switching means, depending upon the position of the housing means, serving either to render the flash-producing circuit effective or ineffective to produce a flash of illumination.

5. In a system contained within housing means, a shutterless camera having a motor-operated film-advancing mechanism, an electric flash-producing circuit for generating a flash of illumination for exposing the film of the camera, energy-supplying means for energizing the camera motor and the flash-producing circuit, timing means for periodically completing and breaking an energization circuit from said energy-supplying means to the camera motor in order, at successive intervals of time only, to energize said motor and effect the advancing of the film, a switch, means operated synchronously with the advancing of the film by the camera motor for operating said switch after said motor energization circuit is broken, and electrical connection means between the switch and the flash-producing circuit for effecting the triggering of the flash-producing circuit to produce a flash of illumination after the advancement of the film has placed an unexposed portion of said film in position for exposure by said illumination and while said camera motor is de-energized.

6. In a system contained within housing means, a camera having a motor-operated film-advancing mechanism; an electric flash-producing circuit for generating a flash of illumination for exposing the film of the camera and comprising a flash-tube through which energy may be discharged to produce a flash of illumination and a normally ineffective discharge device which, when rendered effective, may initiate the discharge of energy through the flash-tube; energy-supplying means for energizing the camera motor and the flash-producing circuit; timing means for rendering the energization of the camera motor periodic in order, at successive intervals of time only, to effect the advancing of the film; a switch operated synchronously with the advancing of the film by the camera motor; electrical connection means between the switch and the normally ineffective discharge device of the flash-producing circuit for rendering the discharge device effective, thereby to initiate the discharge of energy through the flash-tube to produce a flash of illumination upon the advancement of the film; position-controlled switching means adapted to open or close depending upon the position of the housing means; and means for connecting the position-controlled switching means in circuit with the energy-supplying means, the switching means, depending upon the position of the housing means, serving either to render the flash-producing circuit effective or ineffective to produce a flash of illumination.

7. In a system contained within housing means, a camera having a motor-operated film-advancing mechanism; an electric flash-producing circuit for generating a flash of illumination for exposing the film of the camera and comprising a capacitor-operated flash-tube through which energy stored in the capacitor may be discharged to produce a flash of illumination and a normally ineffective capacitor-operated discharge device which, when rendered effective by the discharge of energy stored in its associated capacitor, may initiate the discharge of the flash-tube capacitor through the flash-tube; energy-supplying means for energizing the camera motor and the flash-producing circuit including the said capacitors; timing means for rendering the energization of the camera motor periodic in order, at successive intervals of time only, to effect the advancing of the film; a cam-operated switch controlled synchronously with the advancing of the film by the camera motor; electrical connection means between the switch and the normally ineffective discharge-device capacitor for discharging the same through the discharge device in order to render the discharge device effective, thereby to initiate the discharge of the flash-tube capacitor through the flash-tube to produce a flash of illumination upon the advancement of the film; position-controlled switching means adapted to open or close depending upon the position of the housing means; and means for connecting the position-controlled switching means in circuit with the energy-supplying means, the switching means depending upon the position of the housing means, serving either to render the flash-producing circuit effective or ineffective to produce a flash of illumination.

8. Apparatus as claimed in claim 2 and in which the said camera film-advancing means comprises an electrically operated motor, and there is provided energy-supplying means for energizing the camera motor and the said flash-producing system.

9. Apparatus as claimed in claim 8 and in which there is provided a switch operated synchronously with the operation of the said camera motor, electrical connection means between the switch and the said flash-producing system for effecting the triggering of the flash-producing system to produce the said flash in response to the operation of the switch, position-controlled switching means adapted to open or close depending upon the position of the first housing, and means for connecting the position-controlled switching means in circuit with the energy-supplying means in order, depending upon the position of the first housing, either to render the flash-producing circuit effective or ineffective to produce the said flash.

10. Apparatus as claimed in claim 9 and in which timing means is provided for rendering the energization of the camera motor periodic, thereby, at successive intervals of time only, to effect the advancing of the film.

11. Apparatus as claimed in claim 10 and in which there is provided electrical connection means between the switch and the flash-producing system for effecting the triggering of the flash-producing system to produce a flash upon the advancement of the film.

References Cited in the file of this patent

UNITED STATES PATENTS

| | | |
|---|---|---|
| 2,358,796 | Edgerton | Sept. 26, 1944 |
| 2,441,370 | Pearce | May 11, 1948 |
| 2,487,868 | Grigsby | Nov. 15, 1949 |
| 2,573,885 | Whitman | Nov. 6, 1951 |
| 2,633,783 | Laval | Apr. 7, 1953 |
| 2,697,392 | Zimberoff | Dec. 21, 1954 |
| 2,754,721 | Grass | July 27, 1956 |
| 2,794,944 | Laval | June 4, 1957 |
| 2,873,972 | Bartlett | Feb. 17, 1959 |